United States Patent
Rajagopal et al.

(10) Patent No.: US 8,374,201 B2
(45) Date of Patent: Feb. 12, 2013

(54) PREAMBLE DESIGN FOR SUPPORTING MULTIPLE TOPOLOGIES WITH VISIBLE LIGHT COMMUNICATION

(75) Inventors: Sridhar Rajagopal, Plano, TX (US); Eun Tae Won, Seoul (KR); Ying Li, Garland, TX (US)

(73) Assignee: Samsung Electronics Co., ltd., Suwon-si (KR)

( * ) Notice: Subject to any disclaimer, the term of this patent is extended or adjusted under 35 U.S.C. 154(b) by 345 days.

(21) Appl. No.: 12/871,770

(22) Filed: Aug. 30, 2010

(65) Prior Publication Data

US 2011/0064420 A1 Mar. 17, 2011

Related U.S. Application Data

(60) Provisional application No. 61/276,782, filed on Sep. 16, 2009, provisional application No. 61/280,139, filed on Oct. 30, 2009.

(51) Int. Cl.
*H04J 3/00* (2006.01)
(52) U.S. Cl. ........................................................ 370/476
(58) Field of Classification Search .................. 370/476, 370/431–463, 464–546
See application file for complete search history.

(56) References Cited

U.S. PATENT DOCUMENTS

| | | | |
|---|---|---|---|
| 2007/0064692 A1 | 3/2007 | Pi et al. | |
| 2008/0030711 A1* | 2/2008 | Iizuka | 356/4.03 |
| 2008/0304514 A1 | 12/2008 | Choi et al. | |
| 2009/0022496 A1* | 1/2009 | Shin et al. | 398/118 |
| 2011/0064405 A1* | 3/2011 | Rajagopal et al. | 398/43 |
| 2011/0105134 A1* | 5/2011 | Kim et al. | 455/450 |
| 2011/0299512 A1* | 12/2011 | Fukuda | 370/338 |

FOREIGN PATENT DOCUMENTS

WO   WO 2009/104921 A2   8/2009

OTHER PUBLICATIONS

International Search Report dated Mar. 24, 2011 in connection with International Patent Application No. PCT/KR2010/006314.

* cited by examiner

*Primary Examiner* — Fan Ng

(57) ABSTRACT

For use in visible light communication (VLC), methods for synchronization with multiple topology support and for transmitting an extended preamble. The method for synchronization includes transmitting a two-part preamble sequence. The preamble sequence includes one or more repetitions of a fast locking pattern (FLP) configured to be used for clock synchronization, and one or more repetitions of a topology dependent pattern (TDP) configured to be used to distinguish a plurality of VLC topologies. The method for transmitting an extended preamble includes generating an extended preamble and transmitting the extended preamble during a receive or idle mode for maintaining visibility support and for better synchronization performance.

23 Claims, 10 Drawing Sheets

| CHANNEL | WAVELENGTH BAND (nm) | | SPECTRAL WIDTH (nm) | COLOR FROM CIE DIAGRAM | PROPOSED CODE |
|---|---|---|---|---|---|
| c1 | 380 | 450 | 70 | pB | 000 |
| c2 | 450 | 510 | 60 | B,BG | 001 |
| c3 | 510 | 560 | 50 | G | 010 |
| c4 | 560 | 600 | 40 | yG,gY,Y,yO,O | 011 |
| c5 | 600 | 650 | 50 | rO | 100 |
| c6 | 650 | 710 | 60 | R | 101 |
| c7 | 710 | 780 | 70 | R | 110 |
| c8 | | | | RESERVED | 111 |

FIG. 4

| PREAMBLE 1 | PREAMBLE 2 | PREAMBLE 3 | PREAMBLE 4 | ... | PREAMBLE 'z-1' | PREAMBLE 'z' |

FIG. 7a

| FLP 1 | FLP 2 | ... | FLP 'x' | PREAMBLE 1 | PREAMBLE 2 | ... | PREAMBLE 'y' |

FIG. 7b

| FLP (101010...) | TDP | ~TDP | TDP | ~TDP |

← 64 TO 16,384 BITS →

FIG. 8a

| TDP | ~TDP | TDP | ~TDP |

FIG. 8b

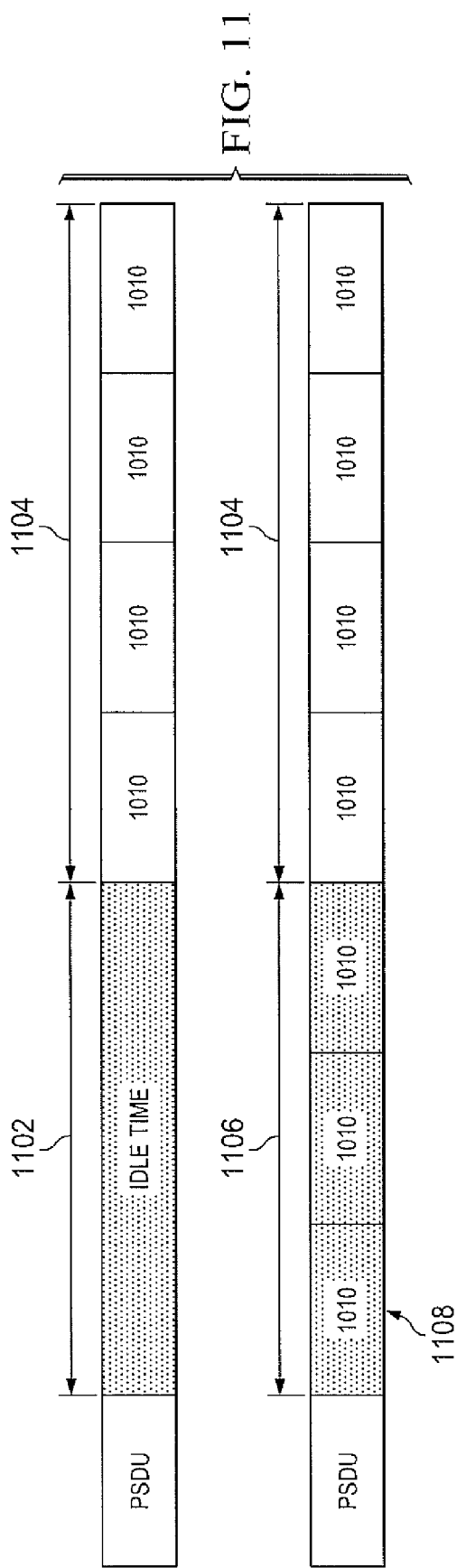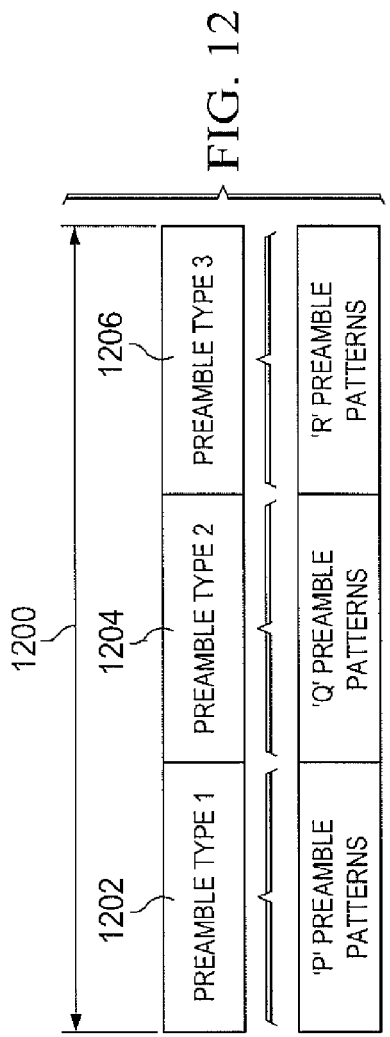

US 8,374,201 B2

PREAMBLE DESIGN FOR SUPPORTING MULTIPLE TOPOLOGIES WITH VISIBLE LIGHT COMMUNICATION

CROSS-REFERENCE TO RELATED APPLICATION(S) AND CLAIM OF PRIORITY

The present application is related to U.S. Provisional Patent No. 61/276,782, filed Sep. 16, 2009, entitled "MULTIPLE PREAMBLES FOR SUPPORTING MULTIPLE APPLICATIONS WITH VISIBLE LIGHT COMMUNICATION". Provisional Patent No. 61/276,782 is assigned to the assignee of the present application and is hereby incorporated by reference into the present application as if fully set forth herein. The present application hereby claims priority under 35 U.S.C. §119(e) to U.S. Provisional Patent No. 61/276,782.

The present application also is related to U.S. Provisional Patent No. 61/280,139, filed Oct. 30, 2009, entitled "MULTIPLE PREAMBLES FOR SUPPORTING MULTIPLE APPLICATIONS WITH VISIBLE LIGHT COMMUNICATION". Provisional Patent No. 61/280,139 is assigned to the assignee of the present application and is hereby incorporated by reference into the present application as if fully set forth herein. The present application hereby claims priority under 35 U.S.C. §119(e) to U.S. Provisional Patent No. 61/280,139.

TECHNICAL FIELD OF THE INVENTION

The present application relates generally to visible light communication and, more specifically, to preamble design and the use of multiple preambles to support multiple topologies in visible light communication.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

FIG. 1 depicts the full electromagnetic frequency spectrum, and a breakout of the wavelengths occupied by visible light. The visible light spectrum extends from approximately 380 to 780 nm in wavelength, which corresponds to a frequency range of approximately 400 to 790 THz. Since this spectrum is large and can support light sources with multiple colors, VLC technology can provide a large number of channels for communication.

SUMMARY OF THE INVENTION

For use in visible light communication (VLC), a method for synchronization is provided. The method includes transmitting a two-part preamble sequence. The preamble sequence includes one or more repetitions of a fast locking pattern (FLP) configured to be used for clock synchronization, and one or more repetitions of a topology dependent pattern (TDP) configured to be used to distinguish a plurality of VLC topologies.

For use in visible light communication (VLC), a method for transmitting an extended preamble is provided. The method includes generating an extended preamble and transmitting the extended preamble during a receive or idle mode for maintaining visibility support and for better synchronization performance.

For use in visible light communication (VLC), a method for distinguishing multiple VLC transmissions is provided. The method includes receiving a first preamble associated with a first VLC transmission. The method also includes rejecting the first VLC transmission, upon a determination that the first preamble does not match an expected preamble. The method further includes receiving a second preamble associated with a second VLC transmission. The method still further includes synchronizing to the second VLC transmission, upon a determination that the second preamble matches the expected preamble.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 depicts an example of color channel assignments for different frequencies of the VLC spectrum;

FIG. 7 depicts a method for attaining a fast lock time for a clock and data recovery (CDR) unit, according to embodiments of the present disclosure;

FIG. 8A depicts a two-part preamble field that may be used by the transceiver to obtain optical clock synchronization and distinguish multiple topologies with an incoming message, according to a preferred embodiment of the present disclosure;

FIG. 8B depicts a preamble field for use in a burst mode transmission, according to one embodiment of the present disclosure;

FIG. 11 depicts a more detailed example of an extended preamble mode, according to one embodiment of the present disclosure;

FIG. 12 depicts an extended preamble comprising a concatenation of multiple preamble types for separation of different types of VLC interference, according to one embodiment of the present disclosure.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

The following documents and standards descriptions are hereby incorporated into the present disclosure as if fully set forth herein:

IEEE 802.15.7, which may be accessed at the time of filing at http://www.ieee802.org/15/pub/TG7.html;

ECMA TC-47, which may be accessed at the time of filing at http://www.ecma-international.org/memento/TC47-M.htm;

TG7 Technical Considerations Document: IEEE 802.15-09-0564-01-0007.

Figure 1:
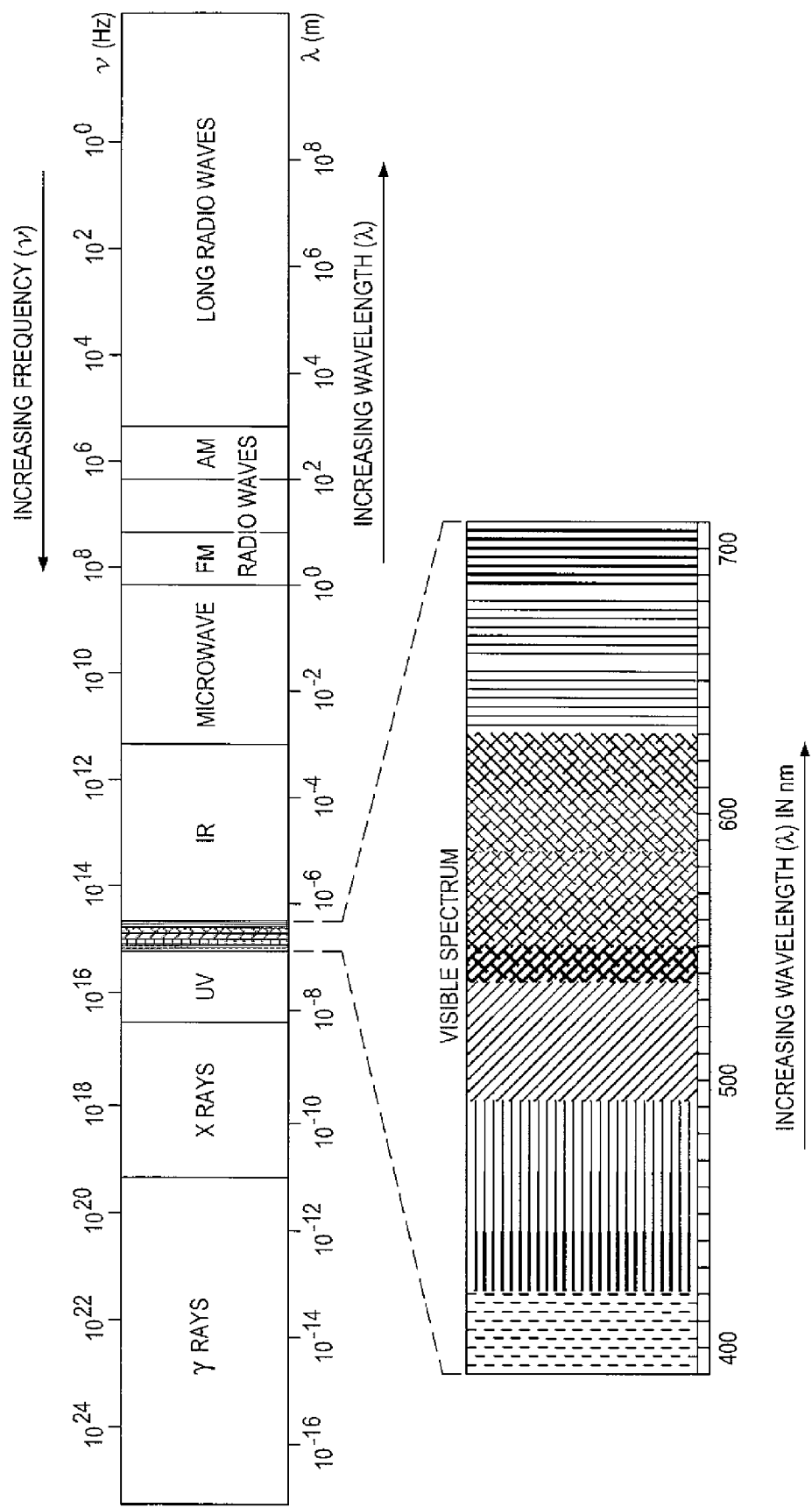
FIG. 1 depicts the full electromagnetic frequency spectrum, and a breakout of the wavelengths occupied by visible light.
Figure 2:
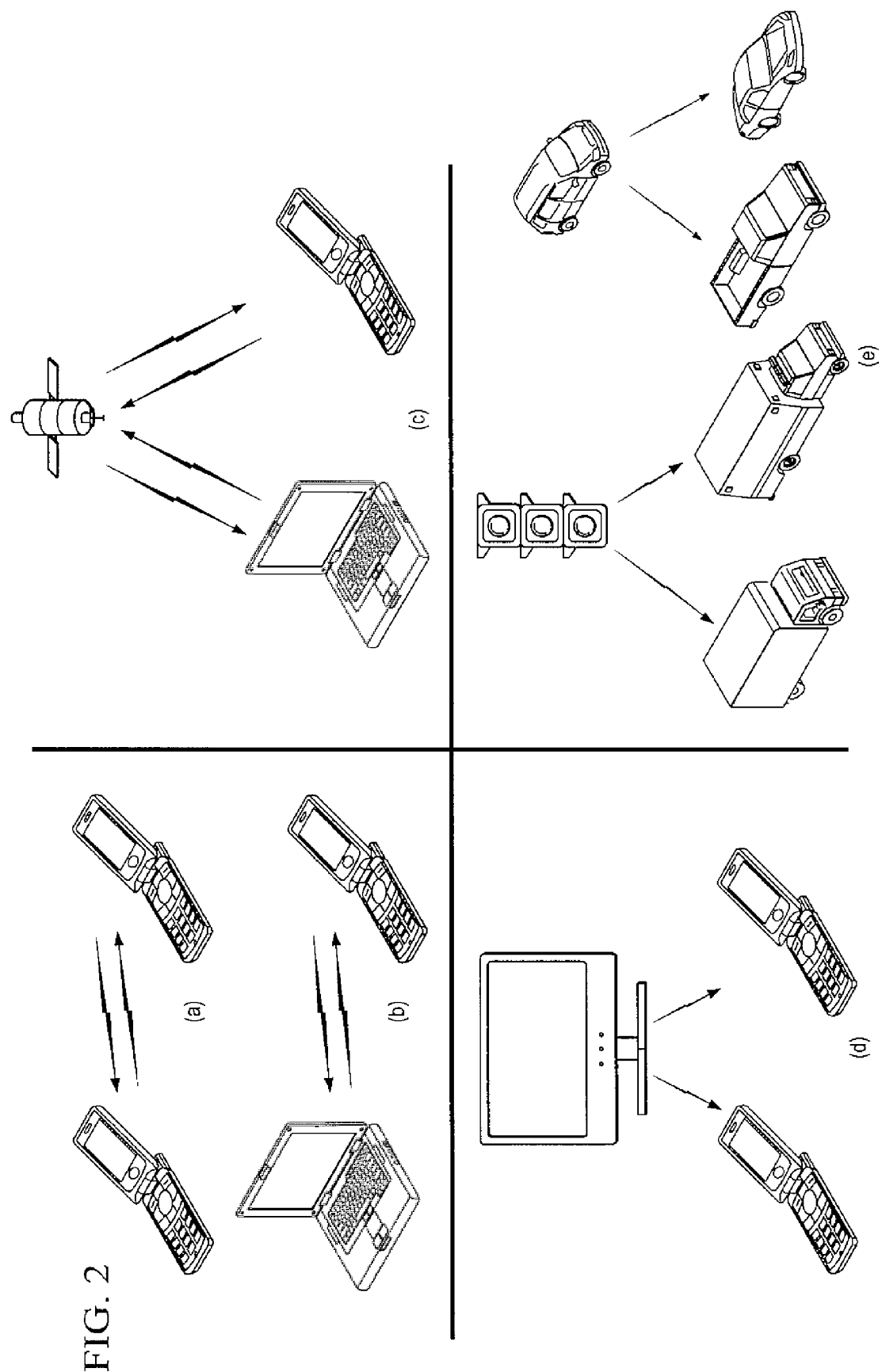
FIG. 2 depicts several exemplary communication methods that can be enabled by VLC.

VLC enables a wide range of topologies with diverse requirements. FIG. 2 depicts several exemplary communication methods that can be enabled by VLC. FIG. 2(a) shows an example of peer-to-peer (P2P) communication. In this example, a mobile phone communicates with another mobile phone using VLC. FIG. 2(b) shows another example of P2P VLC communication for near field communication (NFC). NFC may be used where the communication distance is very short (<30 cm or so). In NFC, very high data rates (>100 Mbps) can be attained. In the example shown, a mobile phone communicates with a laptop computer using VLC.

FIG. 2(c) shows an example of a visible LAN (VLAN) system utilizing a star topology. In VLAN, the infrastructure lighting system also functions as an access point and enables LAN service to one or more devices, such as a laptop or a mobile phone. FIG. 2(d) shows an example of a broadcast topology known as information broadcasting (IB). In an IB system, a display at a public location (e.g., a mall or museum) could broadcast information (e.g., information about facilities, directions, or services) using VLC. Devices (e.g., mobile phones) that are in range of the broadcast may then receive the information. FIG. 2(e) shows another example of a broadcast topology known as vehicular broadcasting (VB). VB may be used, for example, for conveying safety or traffic information from traffic signals or from other cars. It will be understood that the VLC topologies and devices shown in FIG. 2 are for example purposes only. Other VLC topologies and devices are possible.

Figure 3:
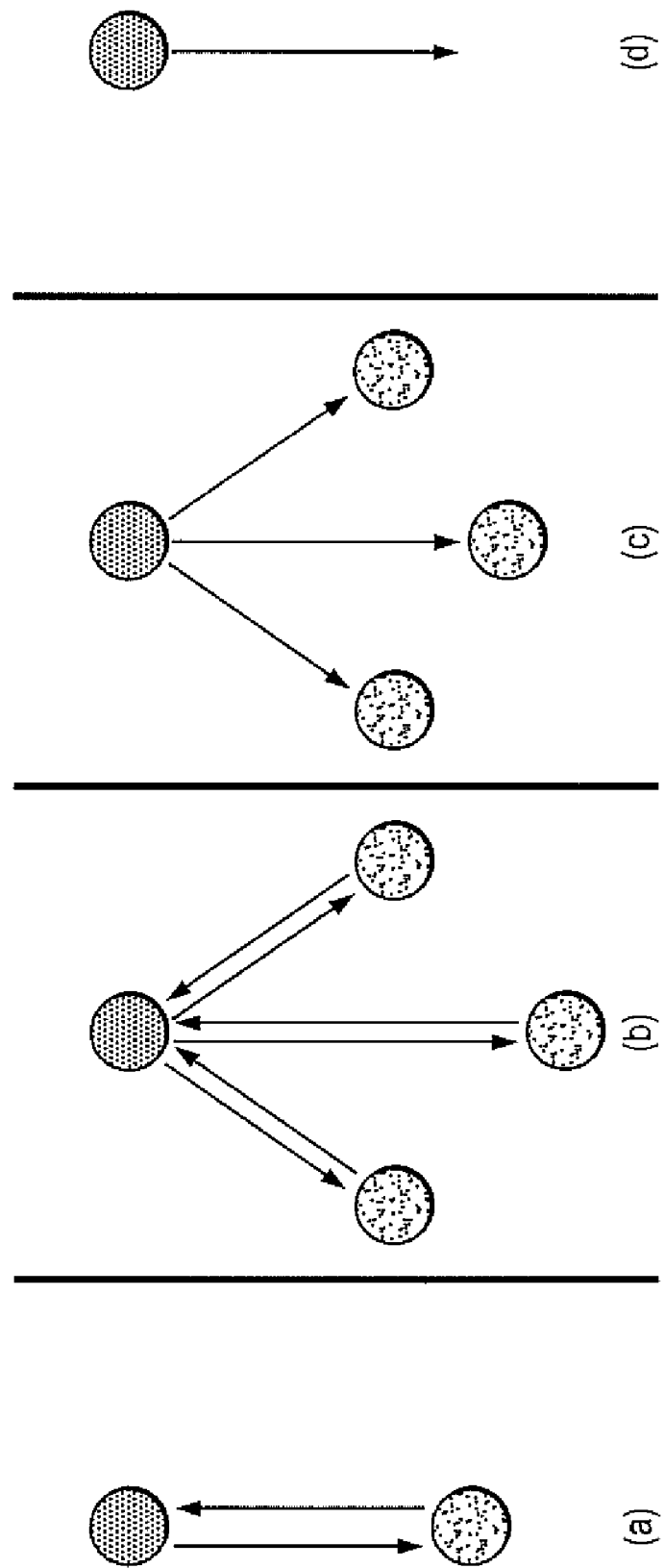
FIG. 3 depicts exemplary topologies supported by VLC communication.

FIG. 3 depicts exemplary topologies supported by VLC communication. For example, VLC supports peer-to-peer topology (shown in FIG. 3(a)). VLC communication using peer-to-peer topology include near field communication (NFC). VLC also supports star topology (shown in FIG. 3(b)). An example of VLC communication using star topology is visible LAN (VLAN). VLC also supports broadcast topology (shown in FIG. 3(c)). Examples of VLC communication using broadcast topology include information broadcasting (IB) and vehicular broadcasting (VB). VLC also supports visibility transmissions during idle or receive periods in the absence of data communication to keep the light source with constant visibility without flickering (shown in FIG. 3(d)). Thus, bi-directional, multicasting, and broadcasting capabilities may be supported using VLC communication.

A piconet is formed when at least two devices, such as a laptop and cell phone, connect. When a piconet is formed, one device can act as a master and the other device (or devices) can act as slaves for the duration of the connection. A piconet may include only two devices (e.g., a peer-to-peer topology), or a piconet may consist of multiple devices connected to a single master (e.g., a star topology). It should be understood that while certain embodiments of the present disclosure are described with reference to piconets, such a reference is for example purposes only, and should not be construed to limit the disclosure to such a network.

FIG. 4 depicts an example of color channel assignments for different frequencies of the VLC spectrum. As can be seen from the example, the visible light spectrum may be divided into multiple color channels in order to allow VLC operation in parallel channels. It is possible that there may be leakage from adjacent color bands into the band of the chosen color, causing adjacent color interference. Because the frequency response at the photo-detector (receiver) can be quite broad (sometimes covering the entire visible range spectrum), care must be taken at the receiver for separating multiple color channels; otherwise, the channels could interfere with each other.

Figure 5:
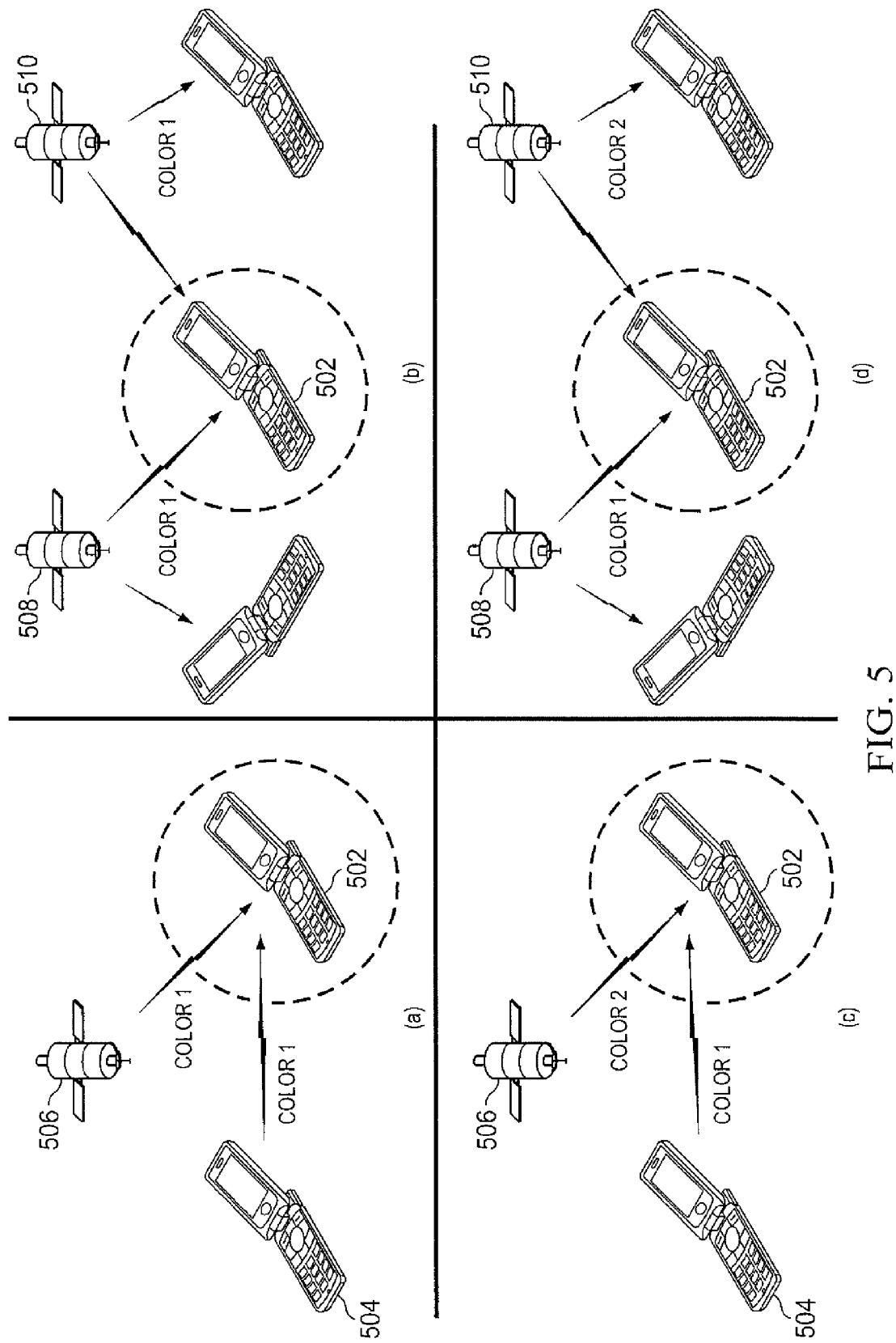
FIG. 5 depicts examples of light interference that may occur during VLC communication.

FIG. 5 depicts examples of light interference that may occur during VLC communication. In addition to interference from ambient light sources such as sunlight, incandescent and fluorescent lamps, VLC may experience three types of network interference: Inter-topology interference (same color), intra-topology interference (same color), and adjacent color interference (different colors).

FIG. 5(a) shows an example of inter-topology interference that may occur when two VLC devices 502 and 504 are communicating in a P2P mode but experience interference from an infrastructure access point 506 that is also using the same color channel. FIG. 5(b) shows an example of intra-topology interference that may occur when a device 502 communicating with one access point 508 in a VLAN network gets interference from a second access point 510 nearby. Intra-topology interference is also applicable in vehicular topologies, for example, when a car gets interference from other cars or from multiple traffic lights. FIGS. 5(c) and 5(d) show the same physical arrangements as FIGS. 5(a) and 5(b), but the interfering light sources in FIGS. 5(c) and 5(d) operate in different (e.g., adjacent) color bands or channels. Since photodiodes can have a very broad frequency response, it is possible that they may pick up signals in adjacent color bands.

This may contribute to interference unless very sharp filters are used. However, such filters may be expensive or complex to build.

Directionality is both an advantage and disadvantage of VLC. If a device experiences interference, it can be difficult for that device to tell other devices of the interference. For example, looking at FIG. 5(a), infrastructure access point 506 may not aware of communication between P2P devices 502 and 504 since the P2P devices are not pointed towards access point 506 and they may have limited transmit power. Thus, directional behavior can help with interference management (by being directional) but also can be an issue (by not being able to resolve interference due to directionality).

Figure 6:
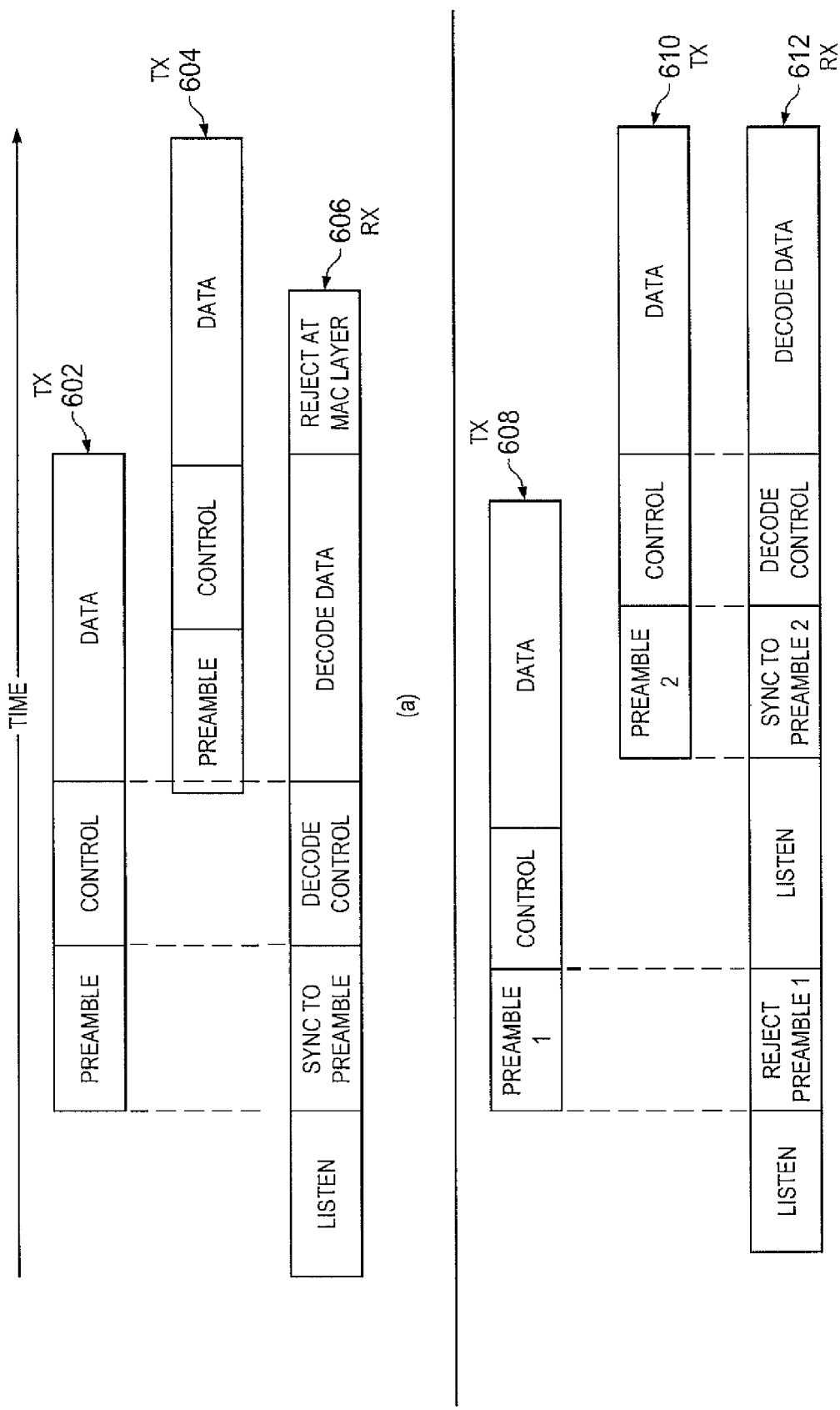
FIG. 6 illustrates a comparison of VLC communication using one preamble and VLC communication using multiple preambles.

FIG. 6 illustrates a comparison of VLC communication using one preamble and VLC communication using multiple preambles. FIG. 6(a) depicts an example of VLC communication using only a single preamble. In this example, a receiver 606 synchronizes to a preamble from an unwanted transmitter 602. Receiver 606 then tries to decode the header and data from unwanted transmitter 602 and finally rejects it at the MAC layer, but only after receiver 606 determines it was not the intended recipient. In the meantime, a desired transmitter 604 attempts to communicate with receiver 606. However, since receiver 606 is busy decoding the transmission from unwanted transmitter 602, it does not listen for desired transmitter 604's preamble. As a result, receiver 606 completely misses the preamble from desired transmitter 604. Thus, having a single preamble leads to both wasted effort in decoding frames belonging to unwanted transmitters and missing frames of a desired transmitter.

In contrast, FIG. 6(b) depicts an example of VLC communication using multiple preamble support, in accordance with embodiments of the present disclosure. In this example, receiver 612 listens for a transmission from desired transmitter 610 having preamble 2. First, receiver 612 receives preamble 1 from unwanted transmitter 608. Since preamble 1 is the wrong preamble, receiver 612 rejects preamble 1 and ignores the remaining transmission from unwanted transmitter 608. Receiver 608 continues to listen until it receives preamble 2 from desired transmitter 610. Once receiver 612 receives preamble 2, it then synchronizes to the transmission from desired transmitter 610.

As illustrated in FIG. 6, since different preambles may be used to distinguish different topologies, adjacent LAN networks and piconets, and/or adjacent color channels, a receiver can reject preambles from unwanted transmitters and continue listening until it sees the preamble of the desired transmitter, thus saving power and having better probability of acquisition.

In best cases, preambles are designed such that the operating signal-to-noise ratio (SNR) is less than that for the lowest data rate. There should be a low probability of misdetection, since the header or payload cannot be decoded without synchronization. There also should be a low probability of false alarm, since it can cause the receiver to continuously trigger, thereby missing the useful data.

In wireless communication standards, multiple preambles are primarily used to separate different logical channels. The preamble designs are typically topology-independent. Since wireless communication systems are fairly omnidirectional (compared to VLC), it is easy to locate and talk to all devices within range and different devices can work without interference. Traditional wireless systems also are built for a particular topology in a particular location. For example, different technologies may be used for VLAN (e.g., IEEE 802.11), P2P (e.g., Bluetooth), and vehicular topologies (e.g., IEEE 802.11p); the different technologies use different parts of the frequency spectrum and can co-exist. VLC provides support for multiple topologies within the same environment but also permits use of the same spectrum across multiple topologies due to directionality. Many optical standards, such as those promulgated by Infrared Data Association (IrDA), use only a single preamble since they do not service as many topologies as VLC.

Thus, a need exists in VLC for inter-topology, intra-topology, and adjacent color separation with the help of multiple preamble support. Embodiments of the present disclosure provide this separation in the preamble design and multiple preamble support. In certain embodiments, different types of VLC interference are distinguished using multiple preambles and their properties. Inter-topology separation, intra-topology separation, and adjacent color separation based on multiple preambles are provided. Although independent preambles could be constructed to provide separation, providing independent preambles to ensure separation for every different type could require hundreds or thousands of preambles, making the system more complex and increasing the length of preamble considerably. Different embodiments modify the number of preambles, their sign, and their cover sequences, thus permitting multiple repetitions of the same preamble to provide separation between different types of VLC interference. These embodiments are summarized in Table 1 below.

TABLE 1

Methods for Providing Separation in VLC

| Type of Interference | Methods for Separation |
| --- | --- |
| Inter-topology interference (same color) | Multiple preambles |
| Intra-topology interference (same color) | Sign change of preambles |
| Adjacent color interference (different colors) | Cover sequence for preamble repetitions |

The method of separation associated with each type of interference reflects a preferred embodiment of the present disclosure. However, it is noted that different embodiments could be arranged or combined so that any combination could be used with any of the three described types of interference (or any other type of interference) for VLC.

In an advantageous embodiment of the present disclosure, multiple preambles are used to separate different VLC topologies and/or piconets. This allows a VLC receiver to synchronize to the correct transmitter and/or piconet and not connect to the wrong transmitter, thus wasting time and power decoding unintended frames. This also allows the receiver to reject unwanted associations and quickly connect to the desired topology without missing the intended transmissions. As shown in FIG. 2, there are four main VLC topologies described in IEEE (i.e., P2P, VLAN, IB and VB) and one topology being considered for ECMA (i.e., NFC). Use of multiple preambles allows a VLC receiver to distinguish different VLC topologies. For example, a VLC device that is built only for vehicular topologies can automatically reject any transmissions from a device intended for P2P or NFC topologies based on the choice and use of different preambles.

In order to determine the number of possible preambles and the preamble length, several factors are considered. Each preamble should be designed such that the operating SNR for decoding the lowest data rate is high. Each preamble should have a low probability of misdetection, since the data cannot be decoded unless the preamble is detected and the received data is synchronized to the transmission time. Each preamble also should have a low probability of false alarm, since false alarms may make the receiver trigger continuously and the useful transmissions may be missed. It is desirable to minimize the overall number of different preambles, since a large number of preambles can make preamble selection and design very complex and can cause false alarms. A small number of preambles also permits the preambles to be shorter in length, providing better throughput efficiency.

FIG. 7 depicts a method for attaining a fast lock time for a clock and data recovery (CDR) unit, according to embodiments of the present disclosure. It is sometimes beneficial to use a 101010 . . . pattern in a preamble to attain a faster lock time for a CDR unit. A 101010 . . . pattern (or 010101 . . . pattern) represents a maximum transition pattern that helps the CDR circuit attain a faster lock. In advantageous embodiments, the maximum transition pattern is 64 bits of alternating "1" and "0" bits, although other maximum transition patterns are possible.

In certain embodiments, the preamble combines a fast locking pattern with multiple topology dependent preamble patterns in order to attain fast locking time and provide separation for multiple topologies and rejection of unwanted topologies. FIG. 7(a) depicts 'z' repetitions of a topology dependent preamble pattern. The 'z' repetitions may include time for locking. In contrast, FIG. 7(b) depicts 'x' repetitions of a fast locking pattern, followed by 'y' repetitions of the topology dependent preamble pattern. The 'z' preamble pattern repetitions required to achieve a lock in FIG. 7(a) may take a longer time than use of a maximum transition pattern (10101 . . . ). Thus, by using 'x' repetitions of the maximum transition pattern and 'y' repetitions of the topology dependent preamble pattern, as shown in FIG. 7(a), a lock may be achieved faster than by using 'z' repetitions of just the preamble pattern.

In one particular example, 'x' may represent a 64-bit maximum transition pattern, and 'y' repetitions of a topology dependent preamble pattern may include 4 repetitions of pattern P1, P2, P3, or P4 shown in Table 2 above. However, it will be understood that other values of 'x' and 'y' and other preamble patterns are possible.

FIG. 8A depicts a two-part preamble field that may be used by the transceiver to obtain optical clock synchronization and distinguish multiple topologies with an incoming message, according to a preferred embodiment of the present disclosure. The preamble field includes one or more repetitions of a fast locking pattern (FLP) followed by one or more repetitions of one of different topology dependent patterns (TDPs), for the purpose of distinguishing different topologies. The MAC may select an optical clock rate for communication during the clock rate selection process. The preamble field may be sent at a clock rate chosen by the transmitter and supported by the receiver. In certain embodiments, the preamble field is a time domain sequence and does not have any channel coding or line coding.

The preamble first starts with a FLP of variable length consisting of at least 64 alternate 1's and 0's. The FLP is fixed to start as a "1010 . . ." pattern (therefore, it ends with a '0'). This maximum transition sequence (MTS) is used to lock the CDR circuit in the shortest time. Typically, the fast locking pattern length is chosen to not exceed the maximum shown in FIG. 8A. Before the CDR attains lock and recovers the clock, it has no way of determining the logic value of the transmitted sequence. After the fast locking pattern, 4 repetitions of one of four TDPs are sent. The TDP is 15 bits in length. The TDP shall be inverted every other repetition (represented in FIG. 5A as ~TDP) to provide DC balance and better synchronization.

FIG. 8B depicts a preamble field for use in a burst mode transmission, according to one embodiment of the present disclosure. For VLC communication between devices, it may be possible to send long streams of data to the same destination even across multiple frames. In such cases, a burst mode can be used that can reduce the preamble repetitions and the interframe spacing (IFS) between the consecutive frames. The reduced number of preamble repetitions improves the throughput of the system and eliminates the inefficiency of retraining the whole receiver since the previous frame was also sent to the receiver from the same transmitter. For the burst mode transmission, the FLP is included only for the first frame, such as shown in FIG. 8A. Subsequent frames do not include the FLP in the burst mode since it is already synchronized to the transmitter. Thus, FIG. 8B depicts only the series of alternating TDPs and inverted TDPs. This reduces the preamble length by at least half and provides improved throughput at the MAC layer.

One advantageous embodiment employs four (4) TDP sequences to separate the P2P, VLAN, IB and VB topologies. The TDP for the NFC topology may be designed independently, since NFC is used for very close communication (<30 cm) where the probability of interference is minimal. To determine the four TDP sequences, one may search a Kasami short-sequence code-set. In general, a search of a $2^n$-bit Kasami sequence may result in a TDP having $2^n$-1 bits. In one example, four fifteen-bit TDP patterns P1-P4 were obtained after a search for Kasami sequences of length sixteen (16). Table 2 shows the four TDP patterns that were obtained from the search.

TABLE 2

| Four TDPs for Different VLC Topologies | |
|---|---|
| P1 | 1 1 1 1 0 1 0 1 1 0 0 1 0 0 0 |
| P2 | 0 0 1 0 1 1 1 0 1 1 1 1 1 1 0 |
| P3 | 1 0 0 1 1 0 0 0 0 0 1 0 0 1 1 |
| P4 | 0 1 0 0 0 0 1 1 0 1 0 0 1 0 1 |

In one embodiment, the TDPs may be mapped to different topologies as shown in Table 3. It will be understood that any TDP pattern may be used for any topology. The mapping in Table 3 demonstrates only one specific example.

TABLE 3

| Mapping TDPs to Topologies | |
|---|---|
| Preamble | Topology |
| P1 | Topology independent |
| P2 | Peer to Peer |
| P3 | Star |
| P4 | Broadcast |

In one embodiment, the preamble patterns are inverted or "flipped", and the inverted patterns are used as additional preambles to distinguish transmissions within a topology type (i.e., intra-topology separation). Here, an inverted pattern means that each bit in the pattern is changed from '1' to '0' or from '0' to '1'. Table 4 shows the inverted TDPs that are based on the preamble patterns of Table 2.

TABLE 4

Inverted Topology Dependent Patterns (TDP)
for Distinguishing within a Topology Type

| | |
|---|---|
| ~P1 | 0 0 0 0 1 0 1 0 0 1 1 0 1 1 1 |
| ~P2 | 1 1 0 1 0 0 0 1 0 0 0 0 0 0 1 |
| ~P3 | 0 1 1 0 0 1 1 1 1 1 0 1 1 0 0 |
| ~P4 | 1 0 1 1 1 1 0 0 1 0 1 1 0 1 0 |

In typical wireless systems, inverted preamble patterns are indistinguishable from unflipped preamble patterns since the communication channel can provide a 180 degree phase shift. However, VLC systems typically use energy-based detection with on-off keying modulation. Thus, by looking at the sign of the received correlation, a determination can be made as to whether a TDP or its inverted pattern was transmitted. Thus, the same correlator can be used for detecting both the preamble pattern and its inverse. Both patterns for a topology can be searched simultaneously without the need for separate preamble patterns.

This method can distinguish between two patterns within a topology type. Two patterns are sufficient in VLC, because in most cases, a single VLC device would not get interference from multiple devices of the same color and same topology due to the directionality of VLC. Higher density can be achieved with multiple color choices, which can be separated using adjacent color separation.

It is possible to derive and define more TDPs using the approach described in the earlier embodiments for distinguishing topologies as a viable alternative for supporting more patterns within a topology type. The tradeoffs may include a longer preamble length and an increased search time for locating a particular piconet or transmitter of a particular topology.

Table 5 shows how both the TDP and the inverted version of the TDP can be used for defining intra-topology separation. The table provides two patterns to distinguish within a topology. If more patterns are desired, other methods, such as generating more preamble sequences or generating more cover sequences (described below), may be used.

TABLE 5

Mapping TDPs to Topologies

| TDP | Topology |
|---|---|
| P1, ~P1 | Topology independent |
| P2, ~P2 | Peer to Peer |
| P3, ~P3 | Star |
| P4, ~P4 | Broadcast |

In another embodiment, cover sequences are defined to separate adjacent color interference. An algorithm is provided to derive cover sequences to provide this separation. Specific cover sequence patterns are also provided. Since a preamble is repeated multiple times for synchronization during a transmission, the preamble may be inverted according to a certain pattern to distinguish the pattern from other patterns. For example, when the next number in the pattern equals zero, then preamble P1 is transmitted. When the next number in the pattern equals one, then preamble ~P1 is transmitted. The pattern defining the order in which the preamble is flipped is a cover sequence. The cover sequence may also serve as a marker of the end of preamble transmission. For example, when a receiver encounters the preamble associated with the last element of a cover sequence, the receiver knows that the preamble transmission has ended and the control and data are going to follow from the next transmitted symbol. Each logical channel (e.g., the channels shown in FIG. 4) may be assigned a cover sequence.

Table 6 below lists seven (7) cover sequences that provide adjacent color channel separation for seven (7) logical color channels, such as the color channels shown in FIG. 4. Each cover sequence has a length of eight (8), which imposes a minimum requirement of eight (8) preamble repetitions for VLC. In certain embodiments, these cover sequences are applied only at the end of the preamble repetition pattern. For example, if the preamble is being repeated 32 times, the cover sequence is only applied on the last eight repetitions. While Table 6 provides seven (7) cover sequences with a length of eight (8), it will be understood that additional cover sequences, including those having lengths other than eight (8), are possible.

TABLE 6

Cover sequences for Distinguishing Adjacent Color Interference

| Cover Sequence | Distances | Sum | weight |
|---|---|---|---|
| C1: 0 0 0 1 0 1 0 1 | 5 1 4 1 2 1 1 | 15 | 7.79 |
| C2: 0 0 1 0 0 1 0 1 | 5 3 1 3 1 1 1 | 15 | 8.09 |
| C3: 0 0 1 0 1 0 0 1 | 5 3 2 3 0 1 1 | 15 | 8.23 |
| C4: 0 0 1 0 1 0 1 0 | 6 1 4 1 2 1 0 | 15 | 8.65 |
| C5: 0 1 0 0 1 0 1 0 | 6 2 2 3 0 2 0 | 15 | 8.75 |
| C6: 0 1 0 1 0 0 1 0 | 6 2 2 3 0 2 0 | 15 | 8.75 |
| C7: 0 1 0 1 0 1 0 1 | 7 0 5 0 3 0 1 | 16 | 9.41 |

According to one embodiment, an algorithm to generate cover sequences is based on a weighted metric. Frame sync detection is typically based on the sign change. For example, let $x(n)$, $n=0, \ldots, 15$ denote the cover sequence. As a specific example, $$x(n) = ++++++++ ++---++-$$

$$x(n-1) = X++++++ ++++--+.$$

Compute $y(n) = x(n) x(n-1)$ (also referred to as "differential correlation").

For the example shown above, $y(n) = ++++++ ++--+---$.

If the received sign pattern matches --+---, then frame sync is obtained.

The distance metric of the cover sequence depends on the number of mismatches. Higher distance means less probability of false frame sync. Distances closer to the end of the sequence are more important, since the decision at the end of the frame sync sequence is crucial to determining frame detection and the initial parts of the sequence can get lost in AGC and frame detection algorithms. Hence, we can impose a linear weight on the distances as they go closer towards the end of the frame sync sequence.

The cover sequences provided in Table 6 are determined based on this algorithm. It will be understood that use of this or other algorithms may provide additional cover sequences. Such additional cover sequences are within the scope of this disclosure.

The embodiments described above provide a simple mechanism to separate inter-topology, intra-topology and adjacent color interference using only four (4) preambles and seven (7) cover sequences. A brute force approach to generate a separate preamble for each interference type would require $2^{4*2*7} = 2^{56}$ different preambles. A requirement for this many preambles would result in a much larger preamble length, which would be impractical.

FIG. 9 depicts an example of VLC transmission having an extended preamble, according to one embodiment of the present disclosure. In this embodiment, a preamble is extended in advance of a frame transmission. The extended preamble provides reduced flickering and improved visibility, while simultaneously offering additional time for synchronization and additional receiver training for fast association. This can be very beneficial for topologies such as VB, where there may be insufficient preamble length due to mobility, communication over long distances, and/or a short communication timeline.

Figure 9A:
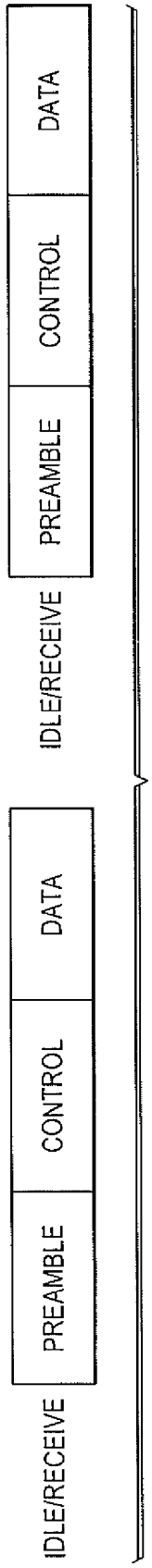
FIG. 9 depicts an example of VLC transmission having an extended preamble, according to one embodiment of the present disclosure.
Figure 9B:
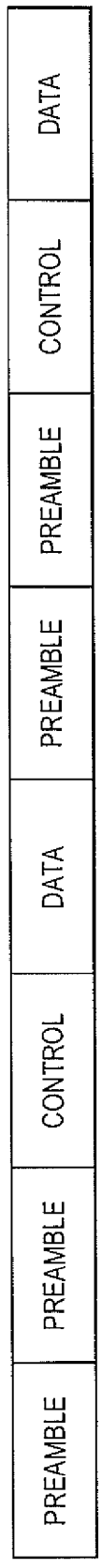

FIG. 9(a) shows a regular transmission of data using a preamble block and a control block followed by a data block. Between transmissions, there are idle or receive blocks where the VLC transmitter does not transmit anything. In contrast, FIG. 9(b) shows that each preamble is extended across the adjacent idle block. Thus, in FIG. 9(b), the transmitter transmits the preamble for an extended time. The extended preamble provides improved visibility, reduced flicker, and faster synchronization with the receiver. The use of these additional preamble repetitions for visibility support may be referred to as extended preamble mode. In advantageous embodiments, the extended preamble repetitions in the extended preamble mode do not use a cover sequence. Instead, the regular preamble has the end of frame provided by the cover sequence pattern. However, it will be understood that other embodiments may permit use of a cover sequence in the extended preamble repetitions.

FIG. 10 depicts an example of VLC transmission that uses a fast locking pattern during idle and receiving blocks in the extended preamble mode, according to one embodiment of the present disclosure. In this embodiment, the fast locking pattern (e.g., 10101010 . . . ) may be transmitted in idle or receive periods to help provide reduced flickering and improved visibility, while simultaneously providing faster and better synchronization.

In certain embodiments, the MAC data frame is sent to the PHY layer and becomes the PHY payload, also called the physical-layer-service data unit (PSDU). The PSDU is prefixed with a preamble sequence and a PHY header (PHR) containing the length of the PSDU in octets. The preamble sequence enables the receiver to achieve symbol synchronization.

Figure 10A:
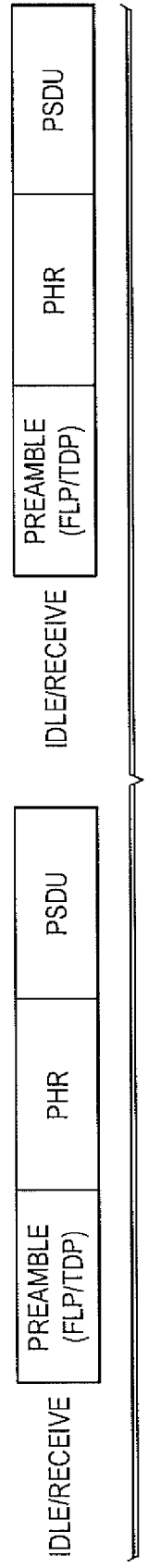
FIG. 10 depicts an example of VLC transmission that uses a fast locking pattern during idle and receiving blocks, according to one embodiment of the present disclosure.
Figure 10B:
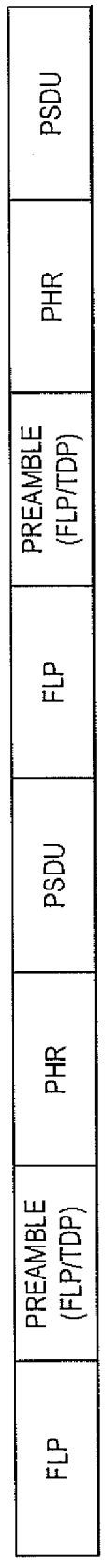

FIG. 10(a) shows a regular transmission of data using a preamble block and a PHR block followed by a PSDU block. Between transmissions, there are idle or receive blocks where the VLC transmitter does not transmit anything. In contrast, FIG. 10(b) shows that a FLP is transmitted during each idle/receive block. The length of the idle/receive block may not be an integral multiple of the length of the FLP. In such cases, it is acceptable to truncate the FLP and transmit a fraction of the FLP in order to maintain visibility. The FLP provides improved visibility, reduced flicker, and faster synchronization with the receiver.

In another embodiment, a number of repetitions (e.g., four repetitions) of a FLP are followed by a number of repetitions (e.g., four repetitions) of the TDP. The repeated patterns are transmitted during each idle/receive block. In other embodiments, the number of repetitions of the FLP and TDPs may be increased or decreased.

FIG. 11 depicts a more detailed example of an extended preamble mode, according to one embodiment of the present disclosure. In this embodiment, an idle time block 1102 is followed by a period of repeated preambles 1104. The media access control (MAC) layer uses knowledge of idle time block 1102 to determine how much idle time is present. The MAC layer then increases the number of preamble repetitions 1106 transmitted to cover idle time block 1102. The extended preamble is made contiguous to the existing preamble of the next frame transmission. The MAC layer may choose to either transmit a visibility pattern or an extended preamble in idle time block 1102. The choice is indicated to the physical (PHY) layer via the MAC-PHY interface. For example, a variable such as "macUseExtendedPreamble" can be set in the MAC to indicate the choice between the visibility pattern or an extended preamble transmission. In certain embodiments, the length of the idle time may not be an integral multiple of the preamble length. In such cases, it is acceptable to transmit a fraction of the preamble (e.g., the latter part) in order to maintain visibility. This fraction of the preamble may be referred to as a truncated preamble.

FIG. 11 depicts an example of a truncated FLP preamble 1108. In FIG. 11, the preamble pattern is shown as pattern '1010'. Additional '1010' preamble blocks 1106 are repeated to fill idle time block 1102. Since idle time block 1102 is not an integral multiple of the FLP '1010', a fraction of the preamble pattern (e.g., '010') may be sent to complete the idle time. Although FIG. 11 shows that truncated FLP preamble 1108 is transmitted before the whole preambles in the extended preamble mode, it will be understood that truncated FLP preamble 1108 may be transmitted at other times, such as after the end of the frame.

FIG. 12 depicts an extended preamble comprising a concatenation of multiple preamble types for separation of different types of VLC interference, according to one embodiment of the present disclosure. The extended preamble is a multi-part preamble that separates different VLC interference types (e.g., inter-topology separation, intra-topology separation, adjacent color separation) by concatenation of multiple preambles, each designed to separate a type of VLC interference. In the embodiment shown, extended preamble 1200 includes three preamble blocks 1202, 1204, and 1206. Preamble block 1202 includes preambles of Preamble Type 1 configured to separate inter-topology interference. Preamble block 1204 includes preambles of Preamble Type 2 configured to separate intra-topology interference. Preamble block 1206 includes preambles of Preamble Type 3 configured to separate adjacent color interference. A different preamble can be generated for each interference type based on a Kasami code set sequence search. The different preambles may be concatenated to form a bigger extended preamble pattern that can distinguish all the different interference types.

As shown in FIG. 12, the length of each preamble type and the number of patterns in each type can be variable. For example, there may be 'P' patterns of Preamble Type 1 in preamble block 1202, 'Q' patterns of Preamble Type 2 in preamble block 1204, and 'R' patterns of Preamble Type 3 in preamble block 1206. The cross-correlation between preambles within the same preamble type may be very good. Cross-correlation between preambles from different preamble types may not be as good. Hence, it will be important for the receiver to know the construction of this jointly coded preamble sequence so that it can stop the correlation at the right point when looking for the right type. For example, in this case, the receiver must first look only for Preamble Type 1 followed by Preamble Type 2 and Preamble Type 3. It will be understood that the ordering of interference types shown in FIG. 12 (inter-topology, intra-topology, and adjacent channel separation) is only for illustrative purposes. Other orders of the interference types are possible.

Figure 13A:
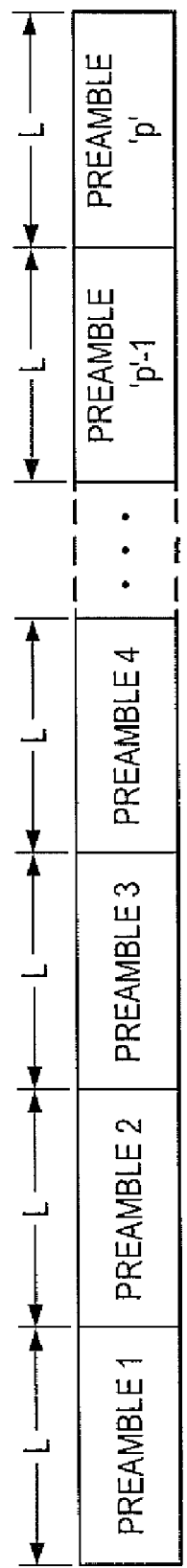
FIG. 13 depicts a method for generating an extended preamble by integrating a fast locking pattern into base preamble pattern repetitions, according to embodiments of the present disclosure.
Figure 13B:
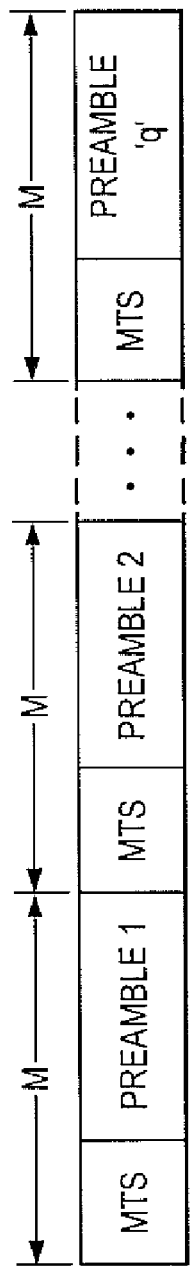

FIG. 13 depicts a method for generating an extended preamble by integrating a fast locking pattern into base preamble pattern repetitions, according to embodiments of the present disclosure. Similar to FIG. 7(a), FIG. 13(a) depicts 'p' repetitions of a preamble having length 'L'. In contrast, FIG. 13(b) shows a new preamble pattern that appends a fast locking maximum transition sequence (MTS) (e.g., 10101 . . . or 01010 . . . ) to the start of each preamble. The new preamble has a length 'M'. However, only 'q' repetitions of the new preamble are required to achieve a lock. This make the overall locking time faster than the preamble pattern in FIG. 13(b).

In other embodiments, the maximum transition sequence can be integrated or added in a part of the preamble other than the start of the preamble (e.g., the middle or the end of the preamble). In other embodiments, other fast locking patterns (e.g., 100100100 . . . , 11001100 . . . , etc.) may be used for locking instead of a maximum transition sequence.

VLC has been shown to be useful for a wide range of topologies. It is desirable to not detect every VLC transmission since some VLC devices may be built or optimized for a single or subset of topologies. For topologies such as VB, time is of great importance since total communication time between the devices may be small. Supporting multiple preambles for VLC permits separation and rejection of interference from different topologies and enables connection to the desired piconet or transmissions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in visible light communication (VLC), a method for synchronization, the method comprising:
    transmitting a two-part preamble sequence, the preamble sequence comprising:
        one or more repetitions of a fast locking pattern (FLP) configured to be used for clock synchronization, and
        one or more repetitions of a topology dependent pattern (TDP) configured to be used to distinguish a plurality of VLC topologies.

2. The method as set forth in claim 1, where the FLP is a maximum transition sequence (MTS) having a repeating 101010 . . . pattern.

3. The method as set forth in claim 1, wherein the TDP is used to distinguish four VLC topologies, the topologies being: peer-to-peer, star, broadcast, and visibility.

4. The method as set forth in claim 1, wherein the TDP is selected from a plurality of predetermined TDPs, each predetermined TDP associated with a Kasami sequence.

5. The method as set forth in claim 4, wherein the plurality of predetermined TDPs comprise the 15-bit patterns "111101011001000", "001011101111110", "100110000010011", and "010000110100101".

6. The method as set forth in claim 1, wherein at least one repetition of the one or more repetitions of the TDP is inverted for better synchronization performance.

7. The method as set forth in claim 6, wherein every other repetition of the one or more repetitions of the TDP is inverted.

8. The method as set forth in claim 1, wherein the two-part preamble sequence is transmitted in a first frame, the method further comprising:
    transmitting a preamble sequence without an FLP in a second frame in a burst mode.

9. The method as set forth in claim 1, wherein the length of the FLP is variable.

10. The method as set forth in claim 9, wherein the length of the FLP is between 64 and 16384 bits.

11. The method as set forth in claim 1, where the TDP is repeated 4 times for determining the topology.

12. The method as set forth in claim 1, where the preamble sequence is transmitted using an On-Off Keying modulation.

13. For use in visible light communication (VLC), a method for transmitting an extended preamble, the method comprising:
    generating an extended preamble; and
    transmitting the extended preamble during a receive or idle mode for maintaining visibility support and for better synchronization performance.

14. The method as set forth in claim 13, wherein the extended preamble is a fast locking pattern (FLP).

15. The method as set forth in claim 13, wherein transmitting the extended preamble comprises transmitting a preamble a predetermined number of times during an idle or receive block.

16. The method as set forth in claim 13, wherein a media access control (MAC) layer determines the extended preamble for transmission and indicates the determined extended preamble to the physical layer (PHY) using a variable in the MAC-PHY interface.

17. The method as set forth in claim 13, wherein a media access control (MAC) layer determines the predetermined number of times the preamble is transmitted based on a length of the idle or receive block.

18. The method as set forth in claim 13, wherein the extended preamble is truncated during transmission when the idle time is not an integral multiple of the preamble length.

19. For use in visible light communication (VLC), a method for distinguishing multiple VLC transmissions, the method comprising:
    receiving a first preamble associated with a first VLC transmission;
    upon a determination that the first preamble does not match an expected preamble, rejecting the first VLC transmission;
    receiving a second preamble associated with a second VLC transmission; and
    upon a determination that the second preamble matches the expected preamble, synchronizing to the second VLC transmission.

20. The method as set forth in claim 19, wherein the first VLC topology and the second VLC topology are different topologies.

21. The method as set forth in claim 20, wherein the first VLC topology comprises communication in a first color channel and the second VLC topology comprises communication in a second color channel.

22. The method as set forth in claim 19, wherein the first VLC topology and the second VLC topology are the same topology.

23. The method as set forth in claim 19, wherein the first preamble is associated with a first cover sequence and the second preamble is associated with a second cover sequence.

* * * * *